Patented Apr. 6, 1954

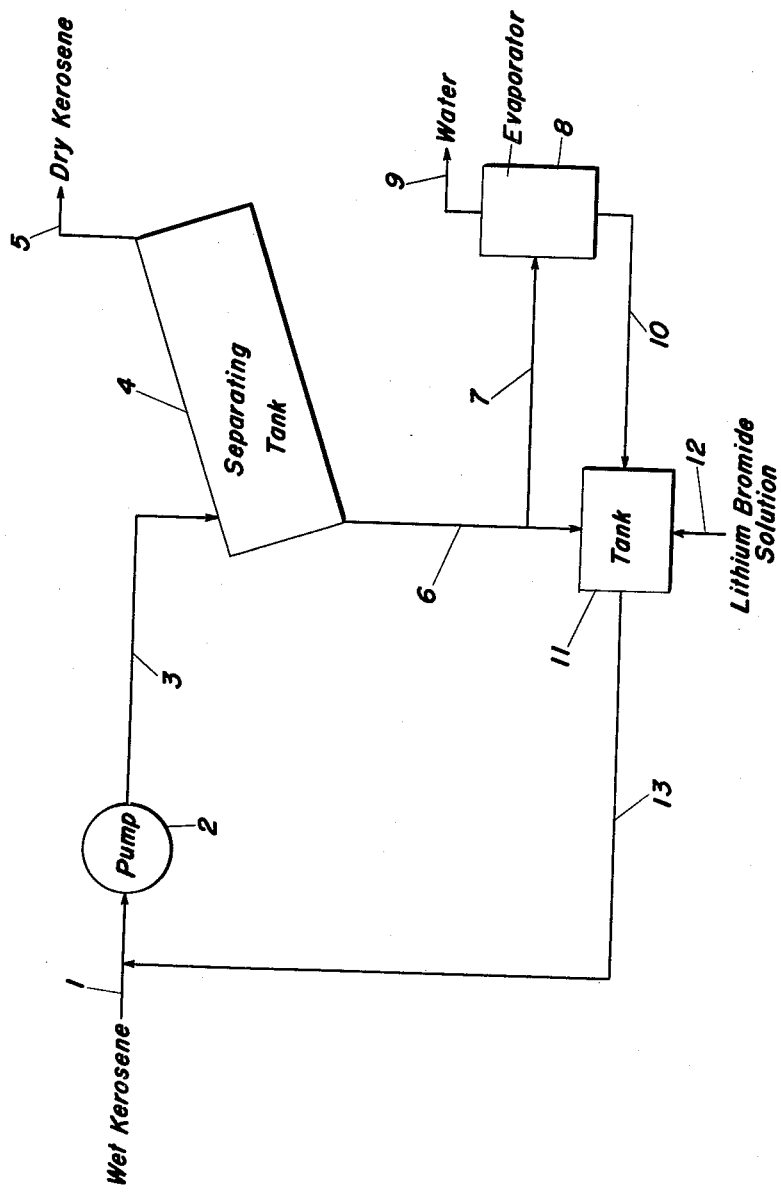

2,674,562

UNITED STATES PATENT OFFICE 2,674,562

DEHYDRATION OF MINERAL OIL

Orrin M. Elliott, Media, Pa., assignor to Sun Oil Company, Philadelphia, Pa., a corporation of New Jersey Application May 5, 1949, Serial No. 91,490

9 Claims. (Cl. 196—4)

This invention relates to a method of dehydrating mineral oil. More particularly, it relates to a method wherein an aqueous solution of a hygroscopic salt is used to remove water contained in mineral oil distillate fractions in solution or in suspension or both.

The invention is especially useful for dehydrating mineral oil fractions of light color, in order to avoid discoloration during dehydration. Also, the invention may be advantageously used to dehydrate mineral oil fractions in cases where the fractions contain such small amounts of water that other dehydrating agents would be ineffective.

In refining mineral oil fractions, it is frequently desirable to remove water therefrom, in order to improve those properties upon which the utility of the fractions depends. Dehydration will often improve the appearance of mineral oil fractions. Furthermore, it is occasionally necessary to dehydrate such fractions in order that subsequent refining operations may be performed, with which the presence of water would interfere.

A prior method commonly practiced for the dehydration of mineral oil fractions has been to contact the liquid to be dehydrated with a solid desiccant possessing the property of being able to absorb water. This method has been extensively used, for example, in the dehydration of kerosene. Materials such as silica gel, alumina, and fuller's earth have been used as dehydrating agents, as well as inorganic salts such as sodium chloride, calcium chloride, and calcium sulfate in solid phase. Numerous other solid materials have been found to be similarly suitable for this type of operation.

During dehydration of a liquid, solid desiccants accumulate water, which must be removed therefrom in a regenerating stage by certain known means, such as heating; in some cases, a regenerating agent such as superheated steam contacts the desiccant and removes water therefrom. Solid desiccants have certain disadvantages which result from the manner in which they are alternately used for dehydration and regenerated.

Where a dehydrating agent must undergo a process including alternate liquid-dehydrating and regenerating stages, it is generally preferable that the process be continuous, with circulation of the dehydrating agent through separate liquid-dehydrating and regenerating zones, instead of intermittent, with the dehydrating agent kept stationary and subjected to liquid-dehydrating and regenerating stages in situ. The intermittent type of operation, to which solid desiccants are more readily adapted than to the continuous type, is disadvantageous in that it gives less through-put of oil for a given size of equipment than the continuous type of operation and is less adaptable to automatic control of process variables. Furthermore, stationary beds of solid desiccant must eventually be replaced because of deterioration, and such replacement is inconveniently time-consuming.

Another disadvantage of this type of dehydration is that many of the otherwise efficient solid drying agents cause discoloration of oil fractions; this is particularly true in the dehydration of kerosene. Discoloration of petroleum fractions results in a substantial decrease in their value and is to be avoided whenever possible. Such discoloration by solid desiccants is believed to be caused by a catalytic effect exerted by the desiccants on the oil, resulting in polymerization of certain constituents to form discoloring resins.

I have discovered that mineral oil distillate fractions may be dehydrated by contacting such materials in liquid phase with another liquid comprising an aqueous solution of a hygroscopic calcium or lithium salt having a concentration which is at least 25% of the saturation concentration expressed in grams of solute per 100 grams of water. Such solutions are immiscible with the oil and have a higher specific gravity, thus allowing separation of the mixture of liquids into an aqueous phase and a dehydrated oil phase by stratification and decantation. This discovery provides a means for achieving a continuous type of dehydration operation wherein the liquid dehydrating agent is circulated throughout a system of apparatus comprising contacting, separating, and regenerating zones; light colored oil fractions may be dehydrated without causing discoloration. The disadvantages of prior dehydration methods as discussed above are thus overcome.

The term, hygroscopic salt, where used in this specification, will be understood to include salts having hygroscopic or deliquescent properties; that is, salts which will absorb water from air of ordinary humidity. Any organic or inorganic calcium or lithium salt which is hygroscopic may be used in the invention. Hygroscopic lithium salts include lithium bromide, lithium chloride, lithium nitrate, lithium perchlorate, lithium dichromate and others. Hygroscopic calcium salts include calcium bromide, calcium chloride, calcium nitrate, calcium thiocyanate, and others.

Preferred hygroscopic salts for use in the invention are lithium chloride, lithium bromide, calcium chloride, and calcium bromide. Lithium bromide solution has been found to exhibit properties of particular desirability in the dehydration of light-colored petroleum fractions. Nearly complete dehydration is possible, and the products obtained have as good color as the material charged. The oil and aqueous layers separate readily to provide easy and efficient recovery of the desired dehydrated product.

The drawing attached to this specification as a part thereof is a diagrammatic representation of one manner of carrying out the invention. The process will be described with reference to this drawing, using kerosene as an example of a water-containing mineral oil fraction and lithium bromide solution as an example of a dehydrating solution, but it is to be understood that the process is applicable to mineral oil distillate fractions generally; also, while lithium bromide is preferred as solute for the dehydrating solution of the invention, other hygroscopic calcium and lithium salts may be used. It is to be further understood that the mechanical features of the operation represented in the drawing are only examples selected from a wide variety of possible methods of carrying out the essential steps of the invention.

In the example represented by the drawing, a kerosene fraction containing water is mixed with a concentrated solution of lithium bromide and passed through line 1 into the centrifugal pump 2, where the oil and salt solution are intimately contacted in continuous operation. The pump discharges an intimate mixture of kerosene and lithium bromide solution through line 3 into the separating tank 4. Auxiliary mixing means may be provided between pump 2 and separating tank 4. In the latter, the mixture resolves by gravity into two phases. The lighter phase is dehydrated kerosene and is continuously removed as product through line 5. The heavier phase is lithium bromide solution which has absorbed water from the kerosene, and it is passed through line 6 into tank 11. From tank 11, the lithium bromide solution is recycled through line 13 to line 1 where it meets the water-containing kerosene charge.

In order to maintain the lithium bromide solution at the desired concentration, it is necessary to remove an amount of water from line 6 equivalent to that absorbed from the kerosene in the drying operation. This is accomplished in the present example by withdrawing from line 6 a portion thereof and passing that portion through line 7 to an evaporating unit 8. In the latter, water is boiled off through line 9, leaving a more concentrated solution, which is removed through line 10, cooled if necessary, and passed to tank 11, where it mixes with the solution of line 6 and serves to maintain the concentration in the tank at the desired level. Lithium bromide lost in the system may be replaced by supplying solution of the proper concentration through make-up line 12.

The more important variables affecting the extent to which the mineral oil is dehydrated are: concentration of salt in the dehydrating solution, ratio of salt solution used to oil charged, and the conditions under which the salt solution and oil are contacted.

In general, the extent of water removal decreases with increasing temperature. It is therefore usually advisable to perform the dehydration at temperatures above the freezing point of the solution but below about 100° F. Thus, the invention provides an important advantage over prior dehydration methods which employ substantial heating of the oil to be dehydrated.

In cases where it is desired to dehydrate mineral oil fractions containing very small amounts of water, e. g., less than 100 parts per million, it is sometimes preferable to conduct the dehydration at relatively low temperatures; that is, at temperatures above the freezing point of the dehydrating solution but below about 50° F.

The extent of water removal, as a general rule, increases with increasing concentration of salt solution. Particularly advantageous concentrations of salt in dehydrating solutions are those from 50% to 100% of the saturation concentration, expressed in grams of solute per 100 grams of water, but lower concentrations are effective in varying degrees.

The volume ratio of salt solution to oil may vary widely, but it is preferred that this ratio be within the range from 6/1 to 1/2. When kerosene is dehydrated by lithium bromide solution, it has been found that in some cases the degree of dehydration increases with increasing ratio of solution to kerosene up to the point where nearly complete removal of water is effected. When kerosene containing about 1000 parts per million of water is contacted with lithium bromide solution, containing about 80 grams of lithium bromide per 100 grams of water, the degree of dehydration increases with increasing solution to kerosene ratio until that ratio becomes about 6 to 1, at which ratio nearly complete dehydration is effected. Increase beyond this ratio gives no substantially improved dehydration. It is preferred to use a solution to kerosene ratio not less than 1 to 2, since the degree of dehydration becomes inconveniently low at greatly reduced ratios.

Intimate contact between solution and oil favors dehydration. Selection of the means by which the solution and oil are to be agitated together is within the ability of a person skilled in the art. The time required for agitation depends on the agitating means; if the latter rapidly produce intimate contact of the solution with all parts of the oil, the agitation time may be quite short; e. g. one second or less. It is preferred, as a matter of economy, that the agitation time be less than five minutes, but longer agitation times are within the scope of the invention.

The following examples will serve to illustrate preferred embodiments of the invention:

*Example I*

Kerosene with a cloud point of 185° F., as determined by the standard A. S. T. M. method for cloud points of oils, indicating a water content of about 1000 parts per million, was contacted at about 76° F. through a centrifugal pump with 6.6 times its volume of lithium bromide solution containing 88.2 grams of lithium bromide per 100 grams of water. The kerosene rate was 1.27 gallons per hour. The kerosene product had a cloud point of less than 0° F., indicating water content less than 5 parts per million.

Increasing the volume ratio of salt solution to kerosene to 11 to 1, and the lithium bromide concentration to 90.3 grams per 100 grams of water resulted, when using 185° F. cloud point kerosene as charge, in a product with a water content of about 5 parts per million. Reducing the ratio to 2 to 1 and the bromide concentration to 85.6 grams per 100 grams of water resulted, again with 185° F. cloud point kerosene, in a product containing about 60 parts per million of water, as evidenced by a cloud point of 70° F.

These data show that a solution to kerosene ratio of 6.6 to 1 gives more complete dehydration under similar conditions than a ratio of 2 to 1, and that increase of the ratio to 11 to 1 does not give substantially improved dehydration over that obtained with a 6.6 to 1 ratio.

*Example II*

Kerosene with a cloud point of 185° F. was shaken for five minutes with an equal volume of lithium bromide solution containing 83.0 grams lithium bromide per 100 grams of water. The equilibrium temperature was 76° F. The mixture was allowed to stand, and the separated kerosene product had a cloud point of 24° F., indicating about 10 parts per million of water. When a solution containing 99.9 grams of lithium bromide per 100 grams of water was used with otherwise similar conditions, the kerosene product had a cloud point of 4° F., indicating less than 5 parts per million of water.

The procedure was repeated at an equilibrium temperature of 120° F. using lithium bromide containing 88.6 grams of solute per 100 grams of water. The kerosene product had a cloud point of 48° F. (35 parts per million of water) indicating that the lower temperature was more favorable to the dehydration.

While, in the above examples, mineral oil fractions containing about 1000 parts per million of water were dehydrated, it will be noted that, with proper choice of conditions, the water content may be reduced to less than 5 parts per million; and it is therefore apparent that mineral oil fractions containing much less water, say less than 100 parts per million, may be substantially reduced in water content according to the invention.

I claim:

1. Method for removing water from a light colored normally liquid mineral oil distillate boiling not substantially above kerosene and containing not substantially more than 1000 parts per million of water which comprises: continuously intimately mixing a liquid stream of such distillate containing not substantially more than 1000 parts per million of water in a contacting zone with a liquid stream comprising an at least 25% saturated aqueous solution of a hydroscopic lithium salt; continuously separating a dehydrated distillate phase from the resulting mixture; removing part of the water from at least a portion of the aqueous phase remaining; and continuously recycling said aqueous phase to said contacting zone.

2. Method for removing water from a light colored normally liquid mineral oil distillate boiling not substantially above kerosene and containing not substantially more than 1000 parts per million of water which comprises: continuously intimately mixing a liquid stream of such distillate containing not substantially more than 1000 parts per million of water in a contacting zone with a liquid stream comprising an at least 25% saturated aqueous solution of a hygroscopic salt selected from the group consisting of hygroscopic lithium and calcium salts; continuously separating a dehydrated distillate phase from the resulting mixture; removing part of the water from at least a portion of the aqueous phase remaining; and continuously recycling said aqueous phase to said contacting zone.

3. Method for removing water from a light colored normally liquid mineral oil distillate boiling not substantially above kerosene and containing not substantially more than 1000 parts per million of water which comprises: continuously intimately mixing one volume per minute of a liquid stream of such distillate containing not substantially more than 1000 parts per million of water with between 0.5 and 6 volumes per minute of a liquid stream comprising a 50-100 percent saturated aqueous solution of a hygroscopic lithium salt, the contacting temperature being above the freezing point of said solution and below about 100° F.; continuously introducing the resulting mixture into a separating zone wherein an aqueous phase and a dehydrated distillate phase are formed; removing dehydrated distillate from said separating zone substantially separately from said aqueous phase; removing said aqueous phase from said separating zone; removing part of the water from at least a portion of said aqueous phase; and continuously recycling said aqueous phase to said contacting zone.

4. Method according to claim 2 wherein said salt is lithium bromide.

5. Method according to claim 2 wherein said salt is lithium chloride.

6. Method according to claim 2 wherein said salt is lithium nitrate.

7. Method according to claim 2 wherein said salt is calcium chloride.

8. Method according to claim 2 wherein said salt is calcium bromide.

9. Method for removing water from a light colored kerosene distillate containing not substantially more than 1000 parts per million of water which comprises: continuously intimately mixing a liquid stream of such distillate containing not substantially more than 1000 parts per million of water in a contacting zone with a liquid stream comprising an at least 25% saturated aqueous solution of a hygroscopic salt selected from the group consisting of hygroscopic lithium and calcium salts; continuously separating a dehydrated distillate phase from the resulting mixture; removing part of the water from at least a portion of the aqueous phase remaining; and continuously recycling said aqueous phase to said contacting zone.

References Cited in the file of this patent

UNITED STATES PATENTS

| Number | Name | Date |
|---|---|---|
| 1,566,009 | Hinrichs | Dec. 15, 1925 |
| 2,305,323 | Savelli | Dec. 15, 1942 |
| 2,324,955 | Rupp et al. | July 20, 1943 |
| 2,326,882 | Perdew | Aug. 17, 1943 |
| 2,356,890 | Schulze | Aug. 29, 1944 |